United States Patent [19]

Kulczyk et al.

[11] Patent Number: 5,022,014

[45] Date of Patent: Jun. 4, 1991

[54] ULTRASONIC TEMPERATURE SENSORS, AND ULTRASONIC WAVEGUIDE CONNECTORS FOR USE THEREWITH

[75] Inventors: Konrad Kulczyk, Bushey; Malcolm P. Perks, Dereham; George W. Smith, London, all of England

[73] Assignee: Schlumberger Industries Limited, Farnborough, England

[21] Appl. No.: 366,075

[22] Filed: Jun. 14, 1989

[30] Foreign Application Priority Data

Jun. 15, 1988 [GB] United Kingdom ............... 8814246
Jun. 15, 1988 [GB] United Kingdom ............... 8814465

[51] Int. Cl.$^5$ .............................................. G01S 15/00
[52] U.S. Cl. ..................................... 367/87; 374/119; 374/13
[58] Field of Search ................ 367/13, 87, 903; 374/117, 119, 137; 340/596, 577, 593

[56] References Cited

U.S. PATENT DOCUMENTS 4,483,630 11/1984 Varela ............................. 374/119
4,513,750 4/1985 Heyman et al. ................. 374/117

FOREIGN PATENT DOCUMENTS 1595314 8/1981 United Kingdom .

OTHER PUBLICATIONS

CRC Handbook of Chemistry and Physics, 53rd Edition, published by the Chemical Rubber Co. specifically from the melting points table on p. D-140.

Primary Examiner—Daniel T. Pihulic
Attorney, Agent, or Firm—Sanford J. Asman

[57] ABSTRACT

An ultrasonic fire detector comprises an elongate ultrasonic waveguide, e.g. in the form of a wire, which is arranged to be strung around the area to be monitored for fire. An ultrasonic pulse generator launches longitudinal ultrasonic pulses into one end of the waveguide, for reflection from the far end. The waveguide is arranged such that local heating due to a fire changes its acoustic impedance at the location of the local heating, the change in acoustic impedance being sufficient to produce partial reflection of the ultrasonic pulses. Detection of the partially reflected pulses thus indicates the presence of a fire, and their time of arrival gives the location of the fire along the waveguide. The acoustic impedance change can be produced by providing the waveguide with notches filled with low melting-point alloy, by applying a temperature-induced stress to the waveguide, or simply by the temperature gradient caused by the fire. Sections of waveguide can be joined together by an ultrasonic waveguide connector comprising two horn-shaped connector portions, each having a narrower end which is welded or brazed to a respective one of the waveguides, and a wider end which is extremely flat and smooth and which is pressed firmly against the corresponding end of the other connector portion by a detachable clamping device. The horns can be conical, catenoidal or exponential in shape, and the clamping device is designed to exert its clamping force as completely axially as possible.

33 Claims, 2 Drawing Sheets

ULTRASONIC TEMPERATURE SENSORS, AND ULTRASONIC WAVEGUIDE CONNECTORS FOR USE THEREWITH

This invention relates to ultrasonic temperature sensors and connectors therefor, and is more particularly, but not exclusively, concerned with temperature sensors and connectors suitable for use in aircraft fire detection systems.

One well known type of temperature sensor for use in aircraft fire detection systems comprises a cable containing two conductors separated by an insulating material whose properties are temperature dependent. The cable is strung out around the area to be monitored for fires, and if a fire occurs in this area, the fire subjects the cable to local heating and so changes the impedance between the wires. Detection of this impedance change thus indicates the presence of a fire.

However, this type of sensor suffers from the drawback that it is difficult to obtain quantitative information from the impedance change that would enable the location of the fire, along the length of the cable, to be readily determined. In an aircraft environment, therefore, where fire extinguishers are typically provided in the area monitored by the cable, all the extinguishers would have to be activated, when perhaps activation of only one of them would have been sufficient to put out the fire. Clearly, the extinguishers which were activated unnecessarily may well cause damage which could have been avoided to equipment, e.g., electrical equipment, in the area being monitored.

It is therefore an object of the present invention to provide temperature sensors, and fire detection systems using them, in which the abovementioned drawback of the known sensors and systems is alleviated.

According to one aspect of the present invention, there is provided a temperature sensor comprising an elongate ultrasonic waveguide, and at least one temperature responsive means which is positioned at a predetermined point along the length of the waveguide and which is responsive to a given temperature change to change the acoustic impedance of the waveguide at that point from a first level to a second level, one of said levels (preferably the second) causing at least partial reflection of ultrasonic pulses arriving at the point.

In one embodiment of this first aspect of the invention, the temperature responsive means comprises a low melting-point material, typically a low melting-point metal alloy, having an acoustic impedance similar to that of the waveguide and disposed in a notch in the waveguide. In this embodiment of the invention, the sensor preferably includes means for retaining the low melting point material in the notch, for example a protective sheath or coating surrounding the waveguide and covering the notch containing the low melting point material. In the case of a protective sheath, the sheath may be produced by swaging or extruding a tube around the waveguide, while in the case of a protective coating, the coating may be produced by plating.

In a second embodiment of the first aspect of the invention, the temperature responsive means comprises a device for applying a mechanical stress which varies with temperature to the waveguide. In this second embodiment of the invention, the device may conveniently comprise a clamp embracing the waveguide, the clamp being arranged such that its clamping force increases with temperature. Thus, the clamp may comprise a first member arranged to trap a second member between itself and the waveguide, the first member having a lower coefficient of thermal expansion than the second.

In both of the first aspects of the invention, the sensor preferably comprises a plurality of said temperature responsive means spaced apart along the length of the waveguide.

The invention also includes a temperature sensing system incorporating a temperature sensor in accordance with any of the preceding statements of invention, and further comprising means for launching ultrasonic pulses, for example longitudinal pulses, into one end of the waveguide, and means for detecting reflected ultrasonic pulses due to said acoustic impedance change. Advantageously, the sensor also includes means for measuring the time interval between each said reflected pulse and the launched pulse which gave rise to it.

According to another aspect of the invention, there is provided a temperature sensor comprising an elongate ultrasonic waveguide having a core of a low melting-point material, typically a low melting-point metal alloy, ensheathed in casing, which, when locally heated, permits local melting of the core, whereby ultrasonic pulses travelling in the core are at least partially reflected by the locally melted portion thereof.

The invention further includes a temperature sensing system incorporating a sensor in accordance with the preceding paragraph, and further comprising means for launching ultrasonic pulses, for example longitudinal pulses, into the core at one end of the waveguide, and means for detecting reflected ultrasonic pulses due to local melting of the core.

Advantageously, the sensor further comprises means for measuring the time interval between each said reflected pulse and the launched pulse which gave rise to it.

According to a third aspect of the invention, there is provided a temperature sensing system comprising an elongate ultrasonic waveguide of a material which, when locally heated, develops a temperature gradient which serves to at least partially reflect ultrasonic pulses, means for launching ultrasonic pulses, for example, longitudinal pulses, into the waveguide at one end thereof, and means for detecting reflected ultrasonic pulses due to such a temperature gradient.

Advantageously, the sensor further comprises means for measuring the time interval between each said reflected pulse and the launched pulse which gave rise to it.

Heretofore, when an ultrasonic waveguide was being used as a sensor, it was typically of unitary construction and permanently connected, e.g., by welding or brazing, to the output of the ultrasonic pulse transmitter/-receiver used for injecting ultrasonic pulses into it and receiving ultrasonic pulses from it.

However, if an ultrasonic waveguide is used in such a manner in an aircraft context, for example as described in our aforementioned co-pending patent application, such permanent connections can be rather inconvenient. In an aircraft context, where the ultrasonic waveguide is typically strung around an engine or disposed in a duct, it is usually desirable that the waveguide be readily detachable from the rest of the system associated with it, i.e. from the ultrasonic pulse transmitter/-receiver and associated signal processing circuitry (or indeed, even made in separable sections), to facilitate installation, maintenance and repair. However, this would require the provision of one or more ultrasonic waveguide connectors which are readily disconnectable and reconnectable, while nevertheless having good ultrasonic transmission characteristics. It is an object of the present invention to provide such a connector.

According to a yet further aspect of the present invention, there is provided an ultrasonic waveguide connector comprising first and second solid tapering connector portions of a material having a similar acoustic impedance to that of the waveguides to be connected together, each connector portion having a narrower end connected to a respective one of said waveguides and a wider end which is flat and extends generally perpendicular to the direction of propagation of ultrasonic waves through the connector, and clamping means engageable with said connector portions for clamping the flat ends thereof together.

In a preferred embodiment of the invention, the connector portions are generally horn-shaped: typically they may be shaped like conical horns, catenoidal horns or exponential horns. Further, each connector portion is preferably of the same material as the respective waveguide to which its narrower end is connected.

The clamping means is preferably arranged to apply to said connector portions clamping forces which are directed substantially wholly perpendicularly to the flat ends of the connector portions. Further, the clamping means preferably comprises first and second parts which engage the first and second connector portions respectively and which are adapted for screw-threaded engagement with each other.

Preferably, a thin layer of a suitable acoustic coupling oil or grease is provided between the flat ends of the connector portions before clamping them together.

The invention will now be described, by way of example only, with reference to the accompanying drawings, of which:

Figure 1:
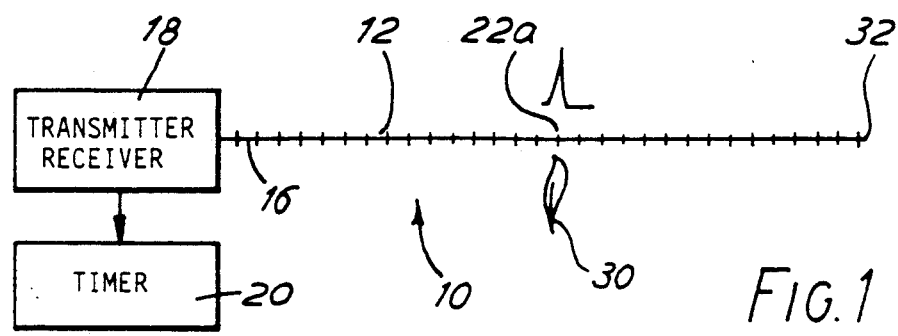
FIG. 1 is a much simplified schematic drawing of a first embodiment of a fire detection sensor and system in accordance with the invention.

The fire detection sensor of FIG. 1 is indicated generally at 10, and comprises an elongate ultrasonic waveguide 12 in the form of a cylindrical rod or wire 14 of nickel, or a nickel-based alloy such as INCONEL or NICHROME, or annealed stainless steel. The waveguide 12 is typically between 3 and 10 meters long, and is divided into a plurality of zones, typically each about 5 to 10 cm long, as will hereinafter become apparent.

Coupled to one end 16 of the waveguide 12 is an ultrasonic pulse transmitter and receiver 18, typically comprising a magnetostrictive device which launches longitudinal ultrasonic pulses (also referred to as compressional or expansional pulses) into the waveguide 12. The transmitter/receiver 18 is also coupled to a timing circuit 20, which is arranged to measure the time interval between each pulse launched into the waveguide 12 and any reflected pulses resulting from that pulse.

Figure 2:
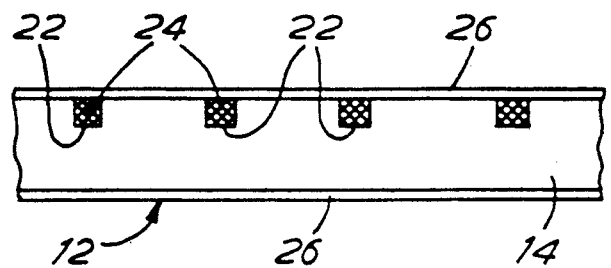
FIG. 2 is a more detailed view of part of the sensor of FIG. 1.

Part of the waveguide 12 is shown in more detail in FIG. 2, where it can be seen that the wire or rod 14 is divided into the aforementioned zones by equally longitudinally-spaced notches 22, which are filled with a low melting-point metal alloy 24, i.e., an alloy having a lower melting-point than the material of which the waveguide 12 is made, whereby the alloy 24 can melt at a temperature which will not melt or deform the waveguide 12 having an acoustic impedance similar to that of the wire or rod 14; a suitable example of such an alloy is the brazing alloy available under the trade mark "EASYFLOW", consisting of about 50% silver alloyed with copper and zinc. To retain the alloy 24 in the notches even when it has melted, a protective sleeve or tube 26 of stainless steel is swaged over the rod or wire 14, covering the notches and the alloy. Alternatively, after the alloy 24 has been placed in the notches 22, the outside of the rod or wire 14 can be plated with a compatible hard material such as nickel or chrome, this plating extending over the alloy-filled notches, to retain the alloy in the notches.

In use, the waveguide 12 is typically strung around an area which is to be monitored for fire, for example around the outside of an aircraft gas turbine engine, within the engine housing or nacelle, the waveguide being sufficiently flexible to permit this. Care must be taken with mounting the waveguide 12 to ensure that the mounting fixtures used do not introduce unwanted variations in the acoustic impedance of the waveguide.

To monitor for fire, ultrasonic pulses are periodically launched into the end 16 of the waveguide 12 by the transmitter/receiver 18, typically at a frequency of 100 Hz: the propagation speed of the pulses in the waveguide is typically about 5000 m/sec. In the absence of a fire, the alloy filled notches 22 are substantially indistinguishable, from an acoustic impedance standpoint, from the remainder of the rod or wire 14, so each pulse launched by the transmitter/receiver 18 travels to the other end 32 of the waveguide 12, and is then reflected back to and detected by the transmitter/receiver 18. The time interval between the launch of each pulse and the arrival and detection of the corresponding end-reflected pulse is measured by the timing circuit 20, the end-reflected pulses being identifiable as such not only by this time interval (since the length and acoustic properties of the waveguide 12 have known predetermined values), but also by virtue of the fact that they are much larger than intermediate reflected pulses. The failure to detect any significant intermediate reflected pulses before the arrival and detection of the end-reflected pulse indicates the absence of fire along the waveguide 12, while the arrival and detection of the end-reflected pulse indicates that the sensor 10 is operating satisfactorily.

In the event that a fire starts in the area being monitored by the sensor 10, as indicated at 30 in FIG. 1, the fire will melt the alloy 24 in at least one of the notches 22, e.g., the one indicated at 22a. This produces a significant change in the acoustic impedance of the waveguide 12 at the notch 22a, which now causes a partial but significant reflection of each pulse launched into the waveguide by the transmitter/receiver 18. Each notch-reflected pulse arrives at and is detected by the transmitter/receiver 18 prior to the predetermined arrival time of the corresponding end-reflected pulse, which indicates to the transmitter/receiver that the detected pulse is indeed a notch-reflected pulse rather than an end-reflected pulse. Further, the time interval between the launch of each pulse by the transmitter/receiver 18 and the arrival and detection of the corresponding notch-reflected pulse is measured by the timing circuit 20. This time interval not only distinguishes notch-reflected pulses from end-reflected pulses, but also indicates where along the length of the waveguide 12 the fire is located.

The detection of notch-reflected pulses by the transmitter/receiver 18 can be used to trigger a fire alarm and the appropriate one or ones of several fire extinguishers in the area being monitored. Assuming that the fire is then extinguished by the operation of the extinguisher or extinguishers, the melted alloy 24 in the notch 22a will re-solidify, thus restoring the sensor 10 to its original state, and so capable of detecting a further fire, should one occur.

Figure 3:
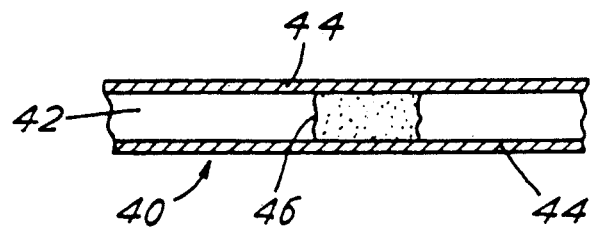
FIG. 3 shows an alternative implementation of the part of the sensor of FIG. 1 shown in FIG. 2.

FIG. 3 shows part of a waveguide 40 which can be used in place of the waveguide 12 of FIGS. 1 and 2. The waveguide 40 comprises a core 42 of a low melting-melting point metal alloy, for example a binary eutectic comprising about 96.5% tin and about 3.5% silver, surrounded by a metal sheath 44 of stainless steel. In response to longitudinal ultrasonic pulses launched into one end of the core 42, the waveguide 40 behaves similarly to the waveguide 12: thus, in the absence of a fire, the pulses travel to the other end of the waveguide 44 and are reflected back, and there are no significant intermediate reflected pulses; but when a fire locally heats the sheath 44, the part of the core 42 also subject to this local heating melts, and reflection occurs at the interface 46 between the melted part of the core and the unmelted part nearer the transmitter/receiver 18. The early arrival, and the time of arrival, of the reflected pulse from this interface indicate the presence and location of the fire, as with the waveguide 12.

Again, extinguishing the fire enables the waveguide 40 to return to its original state.

Figure 4:
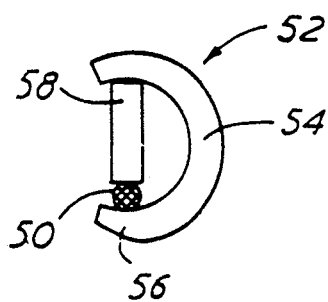
FIGS. 4 and 5 show further alternative forms of part of the sensor of FIG. 1.

FIG. 4 shows at 50 yet another waveguide which can be used in place of the waveguide 12 of FIGS. 1 and 2. The waveguide 12 is just a plain cylindrical rod or wire made from any of the materials specified for the rod or wire 14 of the waveguide 12 (i.e., it has no notches filled with low melting-point metal alloy), and is provided with devices 52 which are spaced along its length at 5 to 10 cm intervals and which are designed to apply a temperature-dependent stress to it. Thus each device 52 comprises a C-clamp 54 of a metal having a low coefficient of thermal expansion, such as INVAR, whose lower extremity 56 supports the waveguide 50. The waveguide 50 is clamped against the lower extremity 56 of the C-clamp 54 by means of a rod or bar 58 of stainless steel, which has a significantly higher coefficient of thermal expansion than the C-clamp 54.

At normal temperatures, each of the C-clamps 54 is arranged merely to lightly clamp the waveguide 50, so as not to significantly affect its acoustic impedance. The waveguide 50 thus behaves like the waveguides 12 and 40 at these normal temperatures. However, if one or more of the devices 52 is subjected to fire, the rod or bar 58 expands more than the C-clamp 54, and applies a substantial localised stress to the waveguide 50. This localised stress behaves in a manner analogous to a notch 22 of the waveguide 12, ie it partially reflects ultrasonic pulses travelling along the waveguide, for detection and time measurement by the transmitter/receiver 18 and the timing circuit 20 respectively.

Extinguishing the fire enables the C-clamp 54 and the rod or bar 58 to return to their normal relative proportions, thus eliminating the localised stress in the waveguide 50 and restoring it to its initial operating state.

Figure 5:
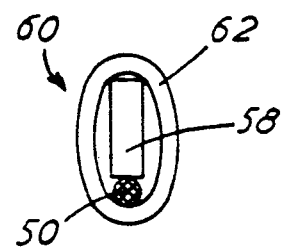

FIG. 5 illustrates, at 60, a variation of the device 52 of FIG. 4, in which the C-clamp 54 is replaced by a complete oval or loop 62 which encircles the waveguide 50 and traps the rod or bar 58 thereagainst. The device 60 otherwise operates in the same manner as the device 52: in particular, extinguishing the fire enables the waveguide 50 to return to its initial operating state.

Some or all of the devices 52 and 60 are used for supporting the waveguide 50 along its route through the area to be monitored for fire.

In the limit, the devices 52 and 60 can be replaced by supports which do not apply thermally-induced stresses to the waveguide 50, since we have found that the localised temperature gradient produced within the waveguide 50 when it is locally heated by a fire behaves analogously to the localised stress produced by the devices 52 and 60, i.e., it partially reflects ultrasonic pulses travelling along the waveguide.

Figure 6:
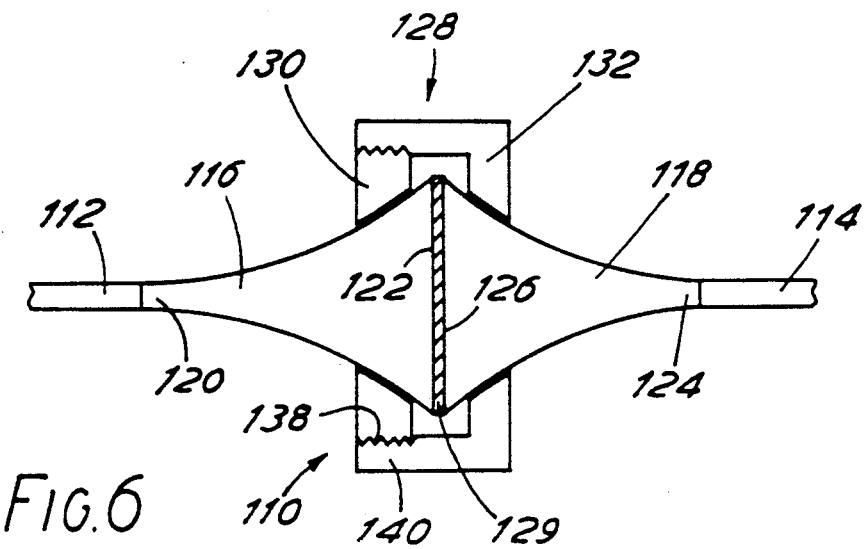
FIG. 6 is a somewhat schematic representation of an ultrasonic waveguide connector in accordance with the present invention.
Figure 7:
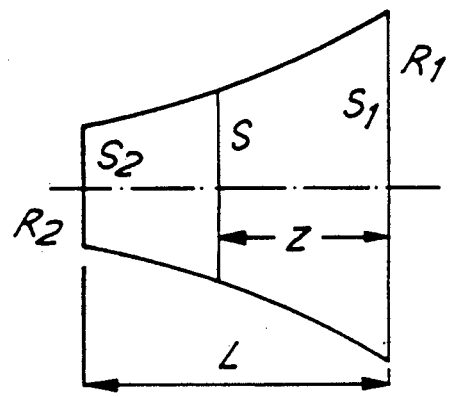
FIG. 7 is a diagram useful for illustrating several possible shapes of part of the connector of FIG. 6.
Figure 8:
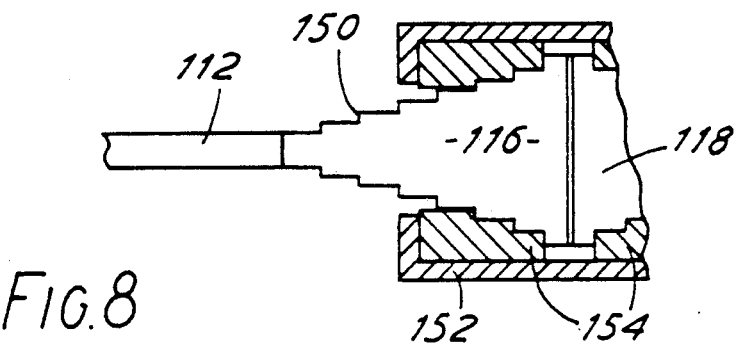
FIG. 8 shows an alternative embodiment of an ultrasonic waveguide connector in accordance with the present invention.

To facilitate assembly and maintenance, the waveguides 12, 40 and 50 can each be connected to the transmitter/receiver 18 by means of an ultrasonic waveguide connector of the kind shown in FIGS. 6 to 8.

The ultrasonic waveguide connector of FIG. 6 is indicated generally at 110, and is shown connecting two ultrasonic waveguides 112 and 114. The waveguides 112, 114 are each in the form of a flexible rod or wire, typically made of nickel, a nickel alloy such as INCONEL or NICHROME or annealed stainless steel.

The connector 110 comprises two similar solid connector portions 116, 118 each of tapering circular section and each made from the same material as the waveguides 112, 114. The connector portion 116 has a narrower end 120 which is butt-welded to the waveguide 112, and a wider end 122 which is extremely flat and smooth. Similarly, the connector portion 118 has a narrower end 124 which is butt-welded to the waveguide 114 and a wider end 126 which is also extremely flat and smooth and which is of the same size and shape as the end 122 of the connector portion 116.

It will be appreciated that the connector portions 116 and 118 are generally horn-shaped. Within this general shape, they can take the form of a conical horn, a catenoidal horn or an exponential horn.

For a conical horn, the area S of the horn at a distance z from its wider end (122 or 126) is given by the equation:

$$S = S_1 (1 - az)^2 \tag{1}$$

where $$a = \frac{R_1 - R_2}{R_1 \quad L}$$

and where $S_1$ is the area of the wider end (122 or 126), $R_1$ and $R_2$ are the radii of the wider and narrower ends respectively, L is the length of the horn, and z is the distance of the plane in which the area S is measured from the wider end (122 or 126).

For a catenoidal horn, the area S is given by the equation:

$$S = S_2 \cosh^2 b(L-z) \qquad (2)$$

where $$b = \frac{1}{L} \cosh^{-1} \frac{R_1}{R_2},$$

and where $S_2$ is the area of the narrower end (120 or 124), and the other parameters are as defined in relation to equation 1.

Finally, for an exponential horn, the area S is given by the equation:

$$S = S_1 e^{2cz} \qquad (3)$$

where $$c = \frac{1}{L} \operatorname{Ln} \frac{R_1}{R_2}$$

and the other parameters are as defined in relation to equation 1.

The parameters $S$, $S_1$, $S_2$, $R_1$, $R_2$, z and L are illustrated in FIG. 7.

The flat ends 122 and 126 of the connector portions 116 and 118 respectively are clamped firmly in contact with each other by a clamping device shown schematically at 128. To improve the acoustic coupling between the ends 122, 126, a suitable layer 129 of a good acoustic coupling oil or grease is entrapped between them as they are clamped together.

The clamping device 128 is shown for simplicity as two captive annular clamping members 130, 132, each having a radially inner rim 134 or 136 which engages the external surface of a respective one of the connector portions 116, 118 just behind its flat end 122 or 126. However, if it is desired that the clamping members 130, 132 should not be captive, then the inner diameter of each of them is made greater than the diameter of the ends 122, 126 of the connector portions 116, 118, and each clamping member engages its respective connector portion via the intermediary of a respective diametrically splittable annular member (not shown) which fits partly within its clamping member after being fitted on its connector portion: this facilitates assembly of the clamping members onto the connector portions after the connector portions have been welded to their respective waveguides.

The member 130 has an externally threaded radially outer rim 138, while the member 132 has an axially projecting radially outer rim 140 which is internally threaded and which projects past the flat end 126 of the connector portion 118 to receive and engage the threaded rim 138 of the member 130. Thus screwing the clamping members 130, 132 together presses the flat ends 122, 126 of the connector portions 116, 118 firmly into contact with each other.

It is desirable that the clamping device 128 should as far as possible apply only axially directed clamping forces to the connector portions 116, 118. To this end, the clamping members 130, 132 are each arranged to engage the external surface of the respective connector portion 116, 118 as close to the end 122, 126 as conveniently possible, and the portions of the surfaces engaged are arranged to be as nearly radially directed as conveniently possible: indeed, radially extending flanges can be provided if desired.

In use, once the connector 110 is firmly clamped together as described above, it operates to transmit an ultrasonic wave propagating in the waveguide 112 or 114 by first expanding it, then transmitting it through the increased contact area provided by the contacting larger ends 122, 126 of the connector portions 116, 118 (which transmission is enhanced by the presence of the layer 129 of oil or grease), then concentrating it back into the other waveguide. It will be appreciated that the connector is completely bi-directional, i.e., it behaves in the same manner for ultrasonic waves travelling in both directions through it.

Of the several horn shapes mentioned earlier, the catenoid shape exhibits the largest amplifying effect during concentration, while the conical shape is easier to manufacture.

Several modifications can be made to the described embodiment of the connector of the invention. For example, the connector can have cross-sectional shapes other than circular, or indeed varying cross-sectional shape (e.g., from rectangular at the narrower end to circular at the wider end). Additionally, clamping devices other than the device 128 can be employed, and they can be arranged to engage the connector portions 116, 118 via bushes of resilient or compressible material. In particular as an alternative way of ensuring that only axially directed clamping forces are applied to the connector portions 116, 118, the external surfaces of the connector portions can be arranged to follow their respective tapers in a plurality of small steps, ie be provided with a plurality of alternately radially extending and axially extending annular surface portions as shown at 150 in FIG. 8. In this case, the clamping means, indicated at 152 in FIG. 8, can be arranged to act primarily on the radially extending annular surface portions via axial pressure applied to the aforementioned bushes of resilient or compressible material, which are indicated at 154 in FIG. 8.

Many modifications can be made to the described embodiments of the temperature sensors of the present invention. For example, suitable materials other than those specifically cited can be used to make the waveguides 12, 40 and 50, and shapes other than cylindrical, e.g., rectangular-section or flat ribbon shapes, can also be used for these waveguides. Additionally, although the invention has been described in the context of an aircraft fire detection sensor, it can be used more generally as a distributed temperature threshold detector. Typical applications could include an overheating detector, for use e.g. in an aircraft context, to detect temperatures in excess of say 200° C. (as opposed to the fire detection context, where temperatures in excess of say 350° C. are normally being detected), or a refrigeration detector, for detecting when the temperature at any of a number of distributed points in a cold storage facility exceeds −20° C. These lower temperature applications open the possibility of using glass, optical fibre or plastics for the ultrasonic waveguide, and/or extruded plastics coatings (instead of swaged metal coatings) for the metal waveguides with fusible or metal inserts or cores described hereinbefore. Another possible application is in distributed temperature sensing along pipes which have to be uniformly heated along their length, to prevent a fluid which is only liquid at the temperature to which the pipe is heated from solidifying in, and therefore blocking, the pipe. In these other applications, lengths of the waveguide of up to 100 metres can be contemplated, and/or the waveguide can be made in sections connected by ultrasonic waveguide connectors of the kind described hereinbefore.

Further, for some shapes of waveguide, ultrasonic pulses other than longitudinal pulses can be used, for example torsional pulses, and the pulses can in some cases be produced by a piezoelectric device rather than a magnetostrictive device.

Finally, information concerning the mean temperature throughout the area being monitored can be derived from variations in the arrival time of the end-reflected pulses, since the speed of propagation of the pulses in the various waveguides is a function of the temperature of the material of the waveguide, and therefore of the mean temperature of the surroundings of the waveguide; or alternatively, in the notched waveguide embodiment, some of the notches can be left unfilled or discontinuities having a similar effect to unfilled notches can be provided, in which case the respective mean temperatures of the areas between adjacent unfilled notches or discontinuities can be derived from the time intervals between the reflections from these notches or discontinuities.

We claim:

1. A temperature sensor comprising an elongate ultrasonic waveguide, and at least one temperature responsive means which is positioned at a predetermined point along the length of the waveguide and which is responsive to a given temperature change to change the acoustic impedance of the waveguide at that point from a first level to a second level, one of said levels causing at least partial reflection of ultrasonic pulses arriving at the point.

2. A temperature sensor as claimed in claim 1, wherein the temperature responsive means comprises a low melting-point material having a melting-point in the range of about 200° C. to about 900° C. and an acoustic impedance similar to that of the waveguide and disposed in a notch in the waveguide.

3. A temperature sensor as claimed in claim 2, wherein said low melting-point material is a metal alloy.

4. A temperature sensor as claimed in claim 2, further including means for retaining the low melting-point material in the notch.

5. A temperature sensor as claimed in claim 4, wherein the retaining means comprises a protective sheath produced by swaging or extruding a tube around the waveguide.

6. A temperature sensor as claimed in claim 4, wherein the retaining means comprises a protective coating applied to the waveguide by plating.

7. A temperature sensor as claimed in claim 1, wherein the temperature responsive means comprises a device for applying a mechanical stress which varies with temperature to the waveguide.

8. A temperature sensor as claimed in claim 7, wherein the device comprises a clamp embracing the waveguide, the clamp being arranged such that its clamping force increases with temperature.

9. A temperature sensor as claimed in claim 8, wherein the clamp comprises a first member arranged to trap a second member between itself and the waveguide, the first member having a lower coefficient of thermal expansion than the second.

10. A temperature sensor as claimed in claim 1, comprising a plurality of said temperature responsive means spaced apart along the length of the waveguide.

11. A temperature sensor as claimed in claim 1, further comprising means for launching ultrasonic pulses into one end of the waveguide, and means for detecting reflected ultrasonic pulses due to said acoustic impedance change.

12. A temperature sensor comprising an elongate ultrasonic waveguide having a core of a low melting-point material having a melting-point in the range of about 200° C. to about 900° C. and ensheathed in a casing which, when locally heated, permits local melting of the core, whereby ultrasonic pulses travelling in the core are at least partially reflected by the locally melted portion thereof.

13. A temperature sensor as claimed in claim 12, wherein said low melting-point material is a metal alloy.

14. A temperature sensor as claimed in claim 12, further comprising means for launching ultrasonic pulses into the core at one end of the waveguide, and means for detecting reflected ultrasonic pulses due to local melting of the core.

15. A temperature sensing system comprising an elongate ultrasonic waveguide of a material which, when locally heated, develops a temperature gradient which serves to at least partially reflect ultrasonic pulses, means for launching ultrasonic pulses into the waveguide at one end thereof, and means for detecting reflected ultrasonic pulses due to such a temperature gradient.

16. A temperature sensor as claimed in claim 11, further comprising means for measuring the time interval between each said reflected pulse and the launched pulse which gave rise to it.

17. A temperature sensor as claimed in claim 11, wherein said ultrasonic pulse launching means is arranged to produce longitudinal ultrasonic pulses.

18. A temperature sensor as claimed in claim 11, wherein said ultrasonic pulse launching means includes a magnetostrictive device.

19. A temperature sensor as claimed in claim 11, wherein the waveguide incorporates at least one ultrasonic waveguide connector for connecting together respective waveguide portions thereof, said connector comprising first and second solid tapering connector portions of a material having a similar acoustic impedance to that of said waveguide portions to be connected together, each connector portion having a narrower end connected to a respective one of said waveguide portions and a wider end which is flat and extends generally perpendicular to the direction of propagation of ultrasonic waves through said waveguide connector, and clamping means engageable with each said connector portion for clamping the flat ends thereof together.

20. A temperature sensor as claimed in claim 19, wherein said connector portions are generally horn-shaped.

21. A temperature sensor as claimed in claim 20, wherein said connector portions are shaped like conical horns.

22. A temperature sensor as claimed in claim 20, wherein said connector portions are shaped like catenoidal horns.

23. A temperature sensor as claimed in claim 20, wherein said connector portions are shaped like exponential horns.

24. A temperature sensor as claimed in claim 19, wherein each of said connector portions is made of the same material as the respective waveguide to which its narrower end is connected.

25. A temperature sensor as claimed in claim 19, wherein the clamping means is arranged to apply to said connector portions clamping forces which are directed substantially wholly perpendicularly to the flat ends of said connector portions.

26. A temperature sensor as claimed in claim 19, wherein the clamping means comprises first and second parts which engage first and second connector portions, respectively, and which are adapted for screw-threaded engagement with each other.

27. A temperature sensor as claimed in claim 19, wherein a thin layer of a suitable acoustic coupling oil or grease is provided between said flat ends of said connector portions before clamping them together.

28. A temperature sensor as claimed in claim 3, wherein said metal alloy comprises about 50% silver alloyed with copper and zinc.

29. A temperature sensor as claimed in claim 28, further including means for retaining the low melting-point material in the notch.

30. A temperature sensor as claimed in claim 29, wherein the retaining means comprises a protective sheath produced by swaging or extruding a tube around the waveguide.

31. A temperature sensor as claimed in claim 29, wherein the retaining means comprises a protective coating applied to the waveguide by plating.

32. A temperature sensor as claimed in claim 13, wherein said metal alloy comprises about 50% silver alloyed with copper and zinc.

33. A temperature sensor as claimed in claim 32, further comprising means for launching ultrasonic pulses into the core at one end of the waveguide, and means for detecting reflected ultrasonic pulses due to local melting of the core.

* * * * *